Jan. 6, 1925.

1,522,339

E. H. SPECHT

COMBINED BUMPER AND LUGGAGE CARRIER

Filed Oct. 25, 1922

INVENTOR.
Edward H. Specht.
BY Joseph B. Gardner
his ATTORNEY

Patented Jan. 6, 1925.

1,522,339

UNITED STATES PATENT OFFICE.

EDWARD H. SPECHT, OF OAKLAND, CALIFORNIA, ASSIGNOR TO OAKLAND MACHINERY COMPANY, OF OAKLAND, CALIFORNIA, A CORPORATION OF CALIFORNIA.

COMBINED BUMPER AND LUGGAGE CARRIER.

Application filed October 25, 1922. Serial No. 596,778.

*To all whom it may concern:*

Be it known that I, EDWARD H. SPECHT, a citizen of the United States, and a resident of Oakland, county of Alameda, and State of California, have invented a new and useful Combined Bumper and Luggage Carrier, of which the following is a specification.

My invention relates to a device arranged at the rear of an automobile adapted for carrying luggage and other articles.

An object of the invention is to provide a device of the character described which may be unfolded to provide a luggage carrier of large capacity or folded to form an effective bumper.

Another object of the invention is to provide a combined luggage carrier and bumper which may be removably set up, and attached to the automobile, and which is extremely neat and attractive in appearance especially when positioned to function as a bumper.

The invention possesses other objects and features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to said drawings:

Figure 2 is a view similar to Figure 1 showing the device unfolded so as to carry luggage or the like.

Briefly expressed the device of my invention as here shown comprises a pair of brackets secured to the frame of the automobile and having a luggage-carrying frame pivoted and interposed between them, and bumper wings extending outwardly from the sides of the brackets arranged so that the broadside of the carrier frame may lie flush with the bumper faces of the wings when the carrier is disposed in folded position.

A detailed description follows:

The device of my invention in its present embodiment is particularly suited for attachment to the rear of an automobile, and as shown comprises a pair of brackets 2 and 3 which are adapted to be suitably secured to the rear end of the channel frame-members 4 and 5 of the automobile. The brackets are arranged to project rearwardly of the automobile and to preferably lie parallel to each other.

Figure 1:
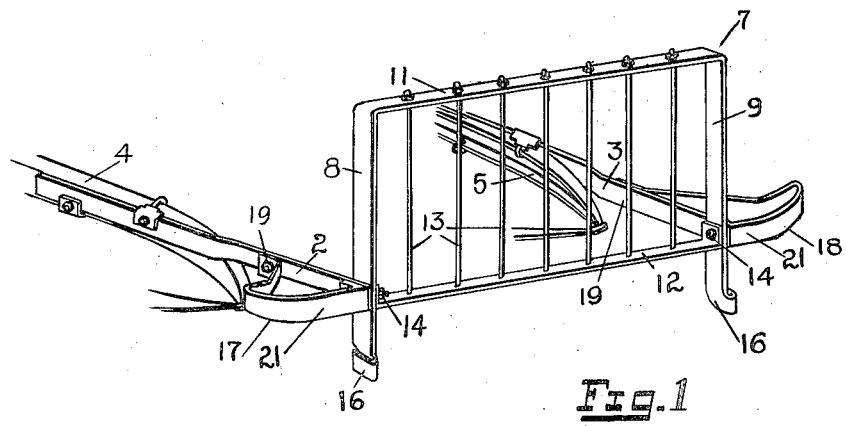
Figure 1 is a perspective view of the device when positioned to provide a bumper.
Figure 2:
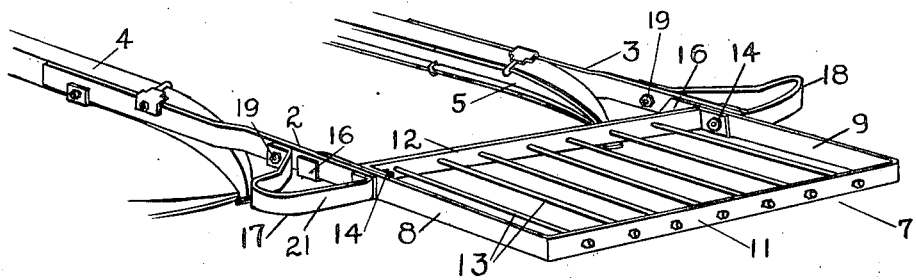

Interposed between the brackets is a luggage carrying frame 7 here shown of rectangular form and composed of side members 8 and 9, cross bars 11 and 12, and parallel panels 13 extending from one bar to the other. The carrier frame by means of bolts 14, is pivoted at its side adjacent the bar 12 to the outer end of the brackets so that it may be folded to assume the upright position shown in Figure 1, or unfolded to assume the extended position shown in Figure 2. In order that the frame may be rigidly held in the latter position, the side members thereof are preferably extended and formed with stops 16 which are arranged to rest under the brackets.

Preferably formed separate of the brackets and the carrier frame are a pair of bumper members or wings 17 and 18 which are secured to the brackets and extend outward from the sides thereof. The bumper wings as here shown are removably attached to the brackets by means of bolts 19 and the pivot bolts 14 which pivotally connect the carrier frame to the brackets. It will be noted by referring particularly to Figure 1, that the bumper face 21 of the wings is practically aligned with the cross rod 12 and axis of rotation of the frame. In this manner when the carrier frame is in the upright position, the cross bar and wings will virtually form a straight continuous guard-rail completely across the rear end of the vehicle. It will also be noted that since the wings are arranged to extend outwardly from the line of the frame members 4, they will be aligned with the fenders of the automobile to protect the same. By reason of the fact that the device is attached to the automobile frame, all shocks will be transmitted directly to the frame. Furthermore, as will be noted by reference to Figure 1, the material of which the wings are formed is thinnest horizontally, whereas the cross member 12 of the carrier has its greatest width horizontally. In this manner the device will have a substantially inflexible central portion and relatively resilient or yielding ends. Thus the device of my invention performs a useful function in either position—a luggage carrier of large capacity in one position, and an extremely well appearing sturdy bumper in the other.

I claim:

1. In a device of the character described, a pair of brackets adapted to be secured to the automobile frame members adjacent the rear end, a luggage carrying frame having parallel side arms and a cross bar connecting said arms, said frame being pivoted to said brackets whereby the axis of rotation of the frame will lie in proximity and substantially parallel to the longitudinal axis of said cross bar, and bumper wings secured to said brackets having their outer faces extending substantially longitudinally of and aligned with said cross bar.

2. In a device of the character described, a pair of bumpers fixedly secured to the rear end of the automobile, and a frame adapted for carrying luggage pivotally mounted and interposed between and connecting said bumpers.

3. In a combined bumper and luggage carrier for automobiles and the like, a pair of brackets adapted to be secured to the rear ends of the longitudinal frame members of the automobile, bumper wings removably secured to and extending outwardly from the side of said brackets, and a luggage carrying frame comprising parallel side members and a cross bar interposed between said bumpers and pivotally secured to said brackets so that the longitudinal axis of said bar will be practically common with the axis of rotation of said carrier frame.

4. A luggage carrier and bumper for automobiles, comprising a bracket adapted to be secured to one of the longitudinal frame members of the automobile at the rear thereof, a bumper carried thereby and having a portion thereof substantially aligned with and directly to the rear of one of the adjacent fenders of the automobile, and a pivotally mounted luggage carrying member carried by said bracket and arranged to be positioned inwardly of an end of said bumper.

5. A luggage carrier and bumper for automobiles, comprising a bracket adapted to be secured to the automobile at the rear thereof, a bumper carried thereby and having a portion thereof arranged to lie directly in the rear of one of the adjacent fenders of the automobile, and a pivotally mounted luggage carrier member carried by the automobile through the medium of said bracket.

6. In a device of the character described, supporting means, a luggage carrier member supported by said means and adapted to be swung to and from an extended position, and a bumper carried by said means arranged to lie forwardly of the rearmost portion of the carrier when the latter is extended and to lie substantially aligned with the rearmost portion of the carrier when the latter is in a retracted position.

7. In a device of the character described, a supporting bracket, a bumper carried by said bracket, and a luggage carrier member carried by said bracket and adapted for movement relative to said bumper.

8. In a device of the character described, a pair of bumpers spaced from each other transversely of an automobile, and a rack mounted to move relative to said bumpers to and from an extended position and arranged when displaced from said latter position to have the rearmost portion thereof approximately terminating in a vertical plane defined by the rearmost portion of said bumpers.

9. In a device of the character described, a bumper adapted to be fixed to an automobile to extend transversely at the rear thereof, a luggage carrier member connected to said bumper movable to and from an extended position and arranged when displaced from said extended position to have the rearmost portion thereof approximately vertically aligned with the rearmost portion of said bumper.

10. In a device of the character described, a bracket fixed to an automobile and extending rearwardly therefrom, a bumper supported by said bracket, and a luggage carrier member associated with said bumper lying inwardly of the outer extremity of said bumper and pivoted to swing about a horizontal axis lying adjacent to the rear face of said bumper.

11. In a device of the character described, a luggage carrier member adapted to be fixed to the rear end of an automobile and mounted to swing to and from an extended position, and bumper members positioned at the opposite sides of said carrier forming closed loops, said loops being substantially in alignment with a member of the luggage carrier.

12. In a device of the character described, a bumper bar fixed to an automobile and extending transversely thereof at the rear and so positioned and formed that it will offer a greater resistance to a vertical thrust than to a horizontal thrust, and a luggage carrier member pivoted to swing from a retracted to an extended position and having a cross rod cooperating with said bumper bar to form therewith a substantially continuous guard member across the rear of the automobile when the carrier is swung back to retracted position, said rod being formed and so disposed in said latter position that it will offer a greater resistance to a horizontal thrust than will said bar.

13. In a device of the character described, a bumper member fixedly mounted at one end of an automobile and extending transversely thereof, and a luggage carrier in substantial alignment with and mounted for movement relative to said bumper.

14. In a device of the character described, a bumper member adapted to be fixedly secured to the automobile and arranged to extend transversely at an end thereof, and a carrier member associated with said bumper mounted to swing upon an axis lying transversely of the automobile and adjacent said bumper.

In testimony whereof, I have hereunto set my hand at Oakland, this 22nd day of September, 1922.

EDWARD H. SPECHT.